July 3, 1934.                    C. M. GOODRICH                    1,965,494
                                  CABLE DAMPENER
                        Filed Sept. 11, 1931       2 Sheets-Sheet 1
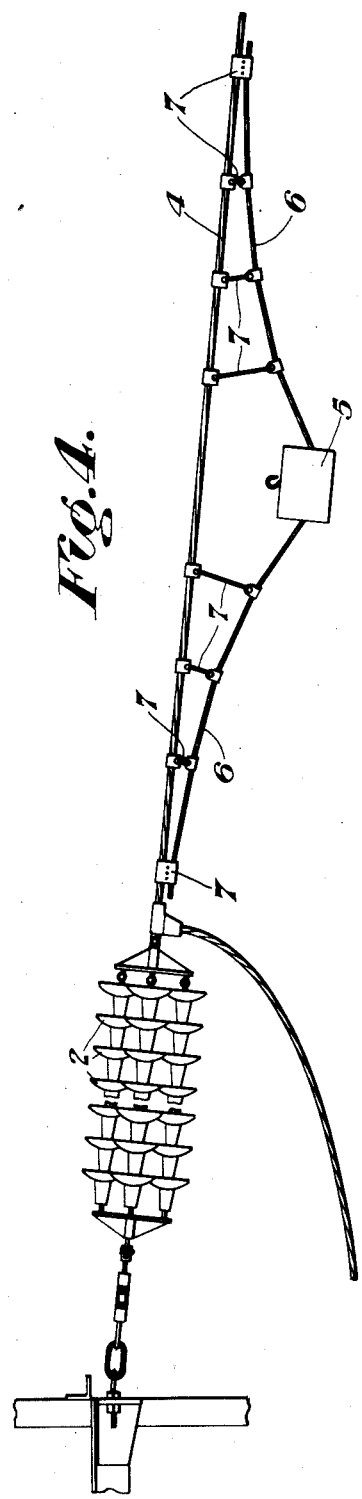
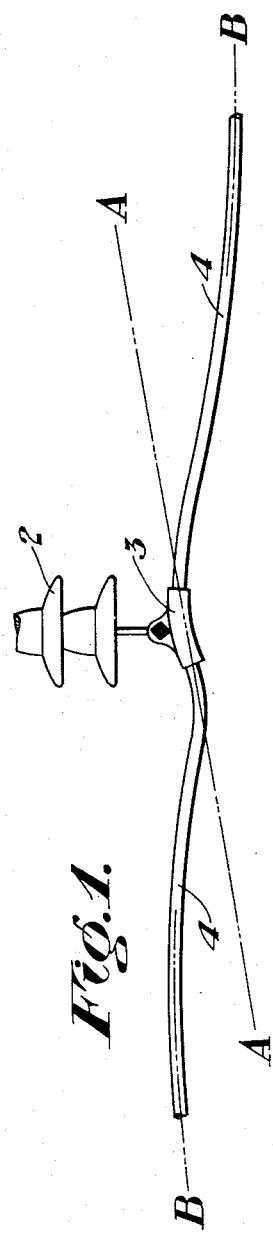
Inventor:
CHAUNCEY MARSH GOODRICH,
by: Usina + Rauber.
his Attorneys.

July 3, 1934. C. M. GOODRICH 1,965,494
CABLE DAMPENER
Filed Sept. 11, 1931 2 Sheets-Sheet 2
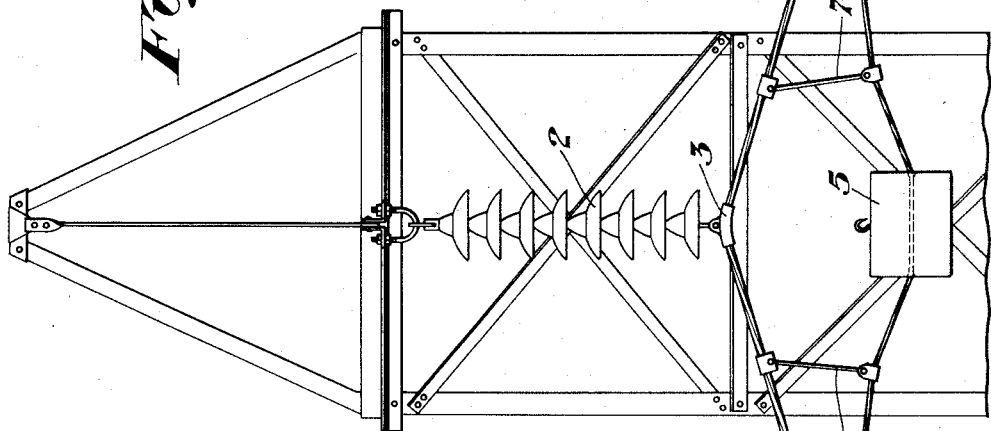
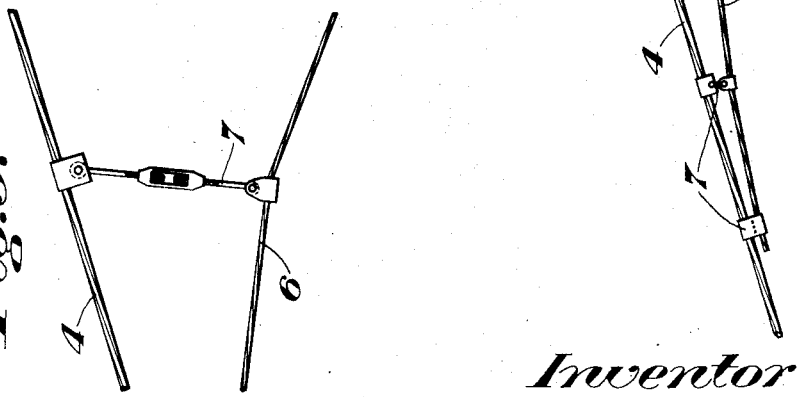
Inventor:
CHAUNCEY MARSH GOODRICH,
by: Usina & Rauber
his Attorneys.

Patented July 3, 1934

1,965,494

UNITED STATES PATENT OFFICE 1,965,494

CABLE DAMPENER

Chauncey Marsh Goodrich, Windsor, Ontario, Canada

Application September 11, 1931, Serial No. 562,358

2 Claims. (Cl. 173—13)

This is an invention for a method and apparatus for dampening suspended cables. A special application is to electric power transmission cables, as they are frequently constructed in spans from 800 to 1200 feet long, which naturally favors the formation of various kinds of destructive cable motion.

One of these motions is a vertical vibration caused by the formation of waves in the cable, and is generally attributed to the force of wind blowing right-angularly across the cable. Damage from this source chiefly results from the fact that a nodal point of this wave formation occurs at a suspension point of the cable. As the clamp holding the cable at this point has a vibration period all its own, it tends to resist the motion of this cable, resulting in the application of bending stresses to the cable which cause fractures.

Another destructive motion is that termed "galloping". This occurs chiefly when the wind blows longitudinally along the cable, its motion consisting of a vertical movement of the cable in its entirety. A cable span will sometimes swing with an amplitude sufficient to cause contact with other wires suspended near it, causing short circuits, and in all cases creates abnormal forces, which must be sustained by the cable supports.

This invention, speaking generally, is designed to prevent the formation of wave motion in cable spans by dampening it at its beginning; namely, one of its natural nodal points. These occur, among other places, at the suspension points of the cable span. This dampening is accomplished by the application of weight to the span to be dampened at spaced points grouped near one of its suspension points. It is anticipated that this invention is to be applied only to cable spans which vibrate, and its application may be after erection of the line and to those spans only which require it.

Having reference to the drawings:

Figure 1 represents, in an exaggerated manner, one of the destructive effects produced by wave formation in an electric power transmission line.

Figure 2 shows an example of the present invention in use.

Figure 3 represents a modified detail of Figure 2.

Figure 4 shows another example of the invention.

More specifically speaking, the first figure shows petticoat insulators 2 and a cable clamp 3, the latter suspending a cable 4 which, it is assumed, extends in spans in either direction to other points of suspension. This cable 4 is shown in a vibratory state having a wave node at the portion held by the clamp 3. This clamp 3 not having the same vibratory period as the cable 4 constantly tends to resist the motion of the latter, tending to assume a position which will cause its axis to be out of alinement with the axis of the cable 4, except for that portion which is rigidly held by this clamp. In the figure under discussion the dotted line A—A represents the axis of the clamp, and the dotted line B—B that of the cable. It will be noticed that at both ends of the clamp 3 a bending stress is exerted, which must necessarily in time prove detrimental to the cable.

As stated, this is one of the direct results leading from cable vibration in transmission lines, one of the others being an excessive vertical movement of the entire cable span. This action is not illustrated, as it may easily be imagined by the reader.

In Figure 2 the string of supporting petticoat insulators 2 are supported by a transmission tower of the usual character, the clamp 3 holding the cable 4 as has been described. In this instance a dampener constructed in accordance with the present invention is applied to the cable span 4 to prevent the formation of destructive motion therein. It consists of a weight 5 from both sides of which a cable 6 extends, supports 7 of varied lengths being fixed to this cable at spaced points at their lower ends, their upper ends being attached to the cable 4 by any suitable clamping means. The cable 6 and supports 7 have their respective lengths proportioned to apply an equal amount of weight to the several points of application along the cable 4. Wave formation is effectively damped because before it can form it must successively lift each of the supports 7, the latter acting as individual weights. By proportioning the weight 5 this invention may be adapted to changing conditions. Another method of varying the dampening effect is illustrated by Figure 3, which shows that the supports 7 may be made longitudinally adjustable, it being thereby possible to apply the force of the weight 5 in varying amounts along the cable 4.

This invention may also be applied to the end of a cable span which does not have an adjacent span, such an arrangement being shown by Figure 4. The action of this form being the same as that just discussed there is no need for further elaboration, although it may be pointed out that this last form is not so well adapted to effectually dampen "galloping".

With the first shown arrangement this is the case, because this motion is a longitudinal vibration which requires a certain amount of synchronism between the cable and its string of supporting insulators, it being possible, by judicious selection of the size of the weight 5, to render the two strongly non-synchronous.

Although a specific form of the invention has been shown in accordance with the patent statutes, it is not intended to limit the scope of this invention thereto, except as defined by the appended claims.

I claim:

1. A dampener for a suspended cable, including the combination of a weight, a length of cable extending from both sides of said weight, and a plurality of supports fixed to said lengths at spaced points and constructed for application to said suspended cable at spaced points, said weight being free except for said extending lengths of cable.

2. A dampener for a suspended cable, including the combination of a weight, a length of cable extending from both sides of said weight, and a plurality of variable length supports fixed to said lengths at spaced points and constructed for application to said suspended cable at spaced points, said weight being free except for said extending lengths of cable.

CHAUNCEY MARSH GOODRICH.